Figure 1:
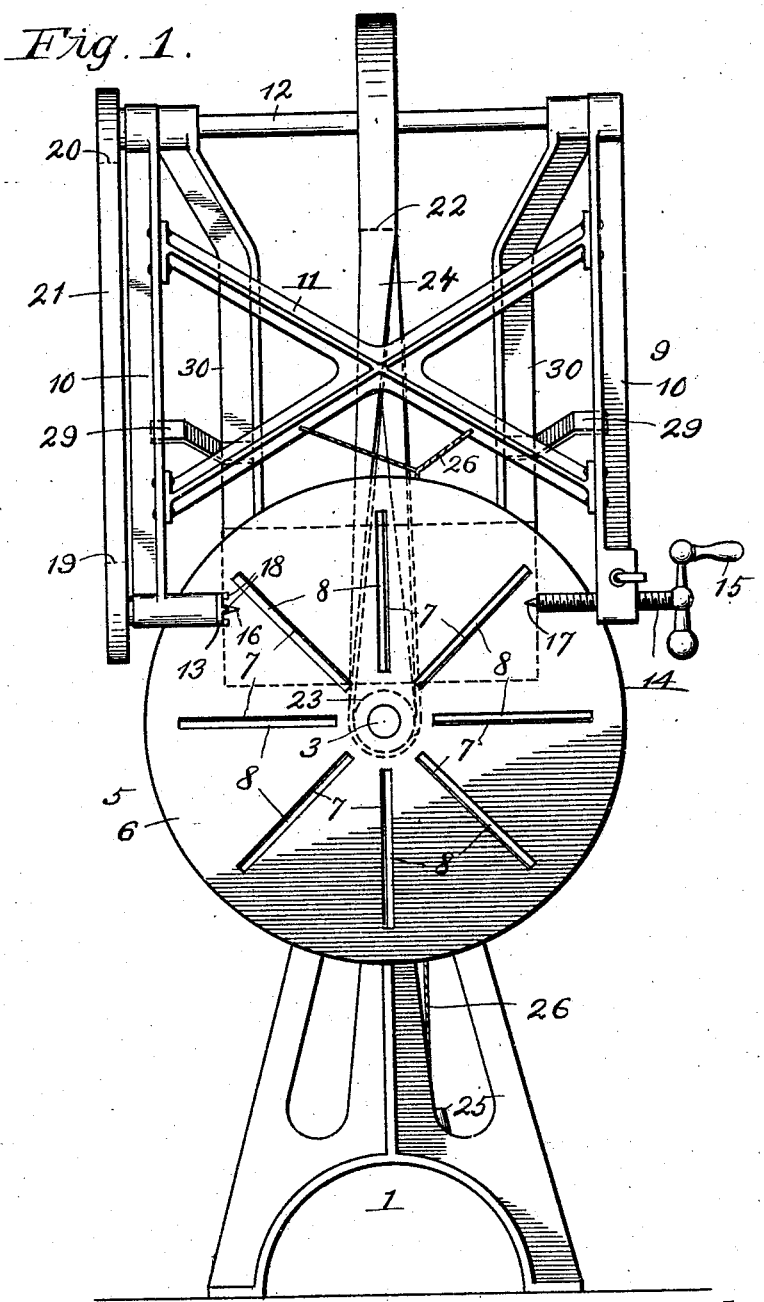

No. 848,884.

PATENTED APR. 2, 1907.

W. D. CRAIG.
EXCELSIOR CUTTING MACHINE.
APPLICATION FILED NOV. 5, 1906.

2 SHEETS—SHEET 1.

Witnesses:
R. E. Hamilton
M. Cox

Inventor,
William D. Craig
By F. G. Fischer
Atty.

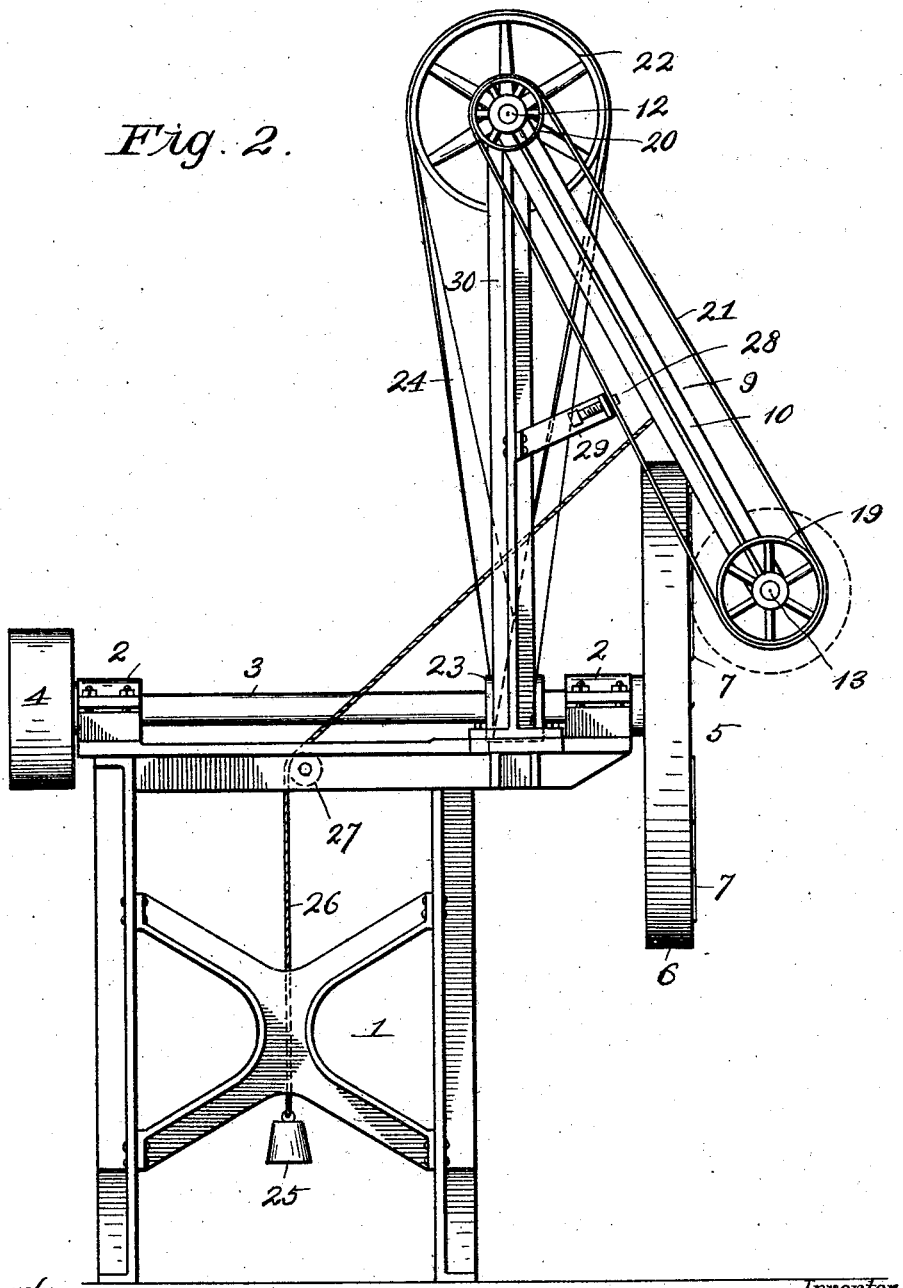

UNITED STATES PATENT OFFICE.

WILLIAM D. CRAIG, OF KANSAS CITY, MISSOURI.

EXCELSIOR-CUTTING MACHINE.

No. 848,884.　　　　　Specification of Letters Patent.　　　　Patented April 2, 1907.

Application filed November 5, 1906. Serial No. 341,999.

*To all whom it may concern:*

Be it known that I, WILLIAM D. CRAIG, a citizen of the United States, residing at Kansas City, in the county of Jackson and State of Missouri, have invented certain new and useful Improvements in Excelsior-Cutting Machines, of which the following is a specification.

My invention relates to improvements in excelsior-cutting machines; and my object is to produce a machine whereby shavings for excelsior packing may be produced expeditiously and at small cost.

The machine is automatic in operation, and hence requires the attention of but one attendant in placing the blocks from which the shavings are cut in position on the machine.

The invention consists of the novel construction, combination, and arrangement of parts hereinafter described, pointed out in the claims, and illustrated in the accompanying drawings, in which—

Figure 1 represents a front elevation of the machine, showing a block in position thereon in dotted lines. Fig. 2 is a side elevation of the same.

In carrying out the invention I employ a main frame 1, provided with bearings 2 for the reception of a drive-shaft 3, arranged to be driven by a pulley 4, fixed upon the rear end thereof.

5 designates a rotary cutter fixed to the opposite end of shaft 3 and consisting of a disk 6 and blades 7, having their cutting edges projecting through slots 8, radially arranged in the disk. 30 30 are standards rising from the main frame 1, as shown.

9 designates a self-adjusting swinging frame for supporting the block and automatically feeding the same to the rotary cutter. Frame 9 consists of a pair of arms 10, secured together by a brace 11 and pivotally supported at their upper ends upon a counter-shaft 12 in the upper ends of the standards 30 so that their lower ends will be free to swing forwardly and backwardly. The lower end of frame 9 is provided with a chuck, comprising a rotary member 13 and an adjustable member 14, which latter is provided with a handle 15, said members being arranged in horizontal alinement in the lower ends of arms 9 and at right angles to the axis of the shaft 3, as shown in Fig. 1.

Members 13 14 are provided with centrally-disposed points 16 17, respectively, for engaging the ends of the block, and member 13 is further provided with sharpened lugs 18 for engaging one end of said block, so that the latter will rotate with member 13, and thus present a new cutting-surface to each of the blades 7. The outer end of member 13 is provided with a fixed pulley 19, driven by a smaller pulley 20, through the instrumentality of an endless belt 21. Pulley 20 is fixed upon one end of shaft 12, which latter is driven by a large pulley 22 fixed thereon. Pulley 22 is driven from shaft 3 by a small pulley 23 and an endless belt 24.

The block is held in contact with the rotary cutter by the weight of frame 9 itself, which is arranged at an angle, as shown in Fig. 2, and a weight 25, suspended from said frame by a cable 26, running over a guide-wheel 27, carried in the upper portion of frame 1.

By employing the gravity-feed just described the block will be drawn into contact with the cutter as rapidly as the latter removes the shavings therefrom, and hence is superior to the worm-feeds usually employed in machines of this character, which have the objections of either feeding too slow or too fast for the cutter.

Before the block has been reduced sufficiently in diameter to permit chuck 13 to come into contact with the cutter the backward movement of frame 9 is stopped by stops consisting of set-screws 28, arranged in the outturned ends of arms 29, projecting forwardly from the standards 30, arranged upon the main frame 1 for the support of shaft 12 and the parts carried thereby. By thus providing the adjustable stops or set-screws 28 it is obvious the backward movement of frame 9 may be checked at the exact point desired.

By rotating the block during the cutting operation it will soon be reduced to cylindrical form, or nearly so, so that the shavings cut therefrom will be of uniform size.

Having thus described my invention, what I claim is—

1. In a machine of the character described, the combination with the main frame and fixed standards rising therefrom, a main shaft journaled in the frame and having a disk cutter and a pulley, a counter-shaft journaled in said standards at right angles to the main shaft, a pulley on the counter-shaft, and belting connecting said pulleys; of a swinging frame comprising arms pivoted at their upper ends on the counter-shaft, chuck members carried by their lower ends, a belt and pulleys connecting one of said members with the counter-shaft, a brace rigidly connecting said arms, a pulley on the main frame, and a cable leading from said brace over the pulley to a weight.

2. In a machine of the character described, the combination with the main frame and fixed standards rising therefrom, a main shaft journaled in the frame and having a disk cutter and a pulley, a counter-shaft journaled in said standards at right angles to the main shaft, a pulley on the counter-shaft, and belting connecting said pulleys; of a swinging frame comprising arms pivoted at their upper ends on the counter-shaft, chuck members carried by their lower ends, a belt and pulleys connecting one of said members with the counter-shaft, a brace rigidly connecting said arms, arms projecting rigidly from said standards above the disk cutter, and set-screws in these arms adapted to be struck by the side arms of said swinging frame, substantially as described.

In testimony whereof I affix my signature in the presence of two witnesses.

WILLIAM D. CRAIG.

Witnesses:
F. G. FISCHER,
M. COX.